Jan. 19, 1943.  J. T. DUFFY, JR., ET AL  2,308,591
CONVEYER
Original Filed Sept. 16, 1939  8 Sheets-Sheet 1

Fig. 1

INVENTORS
J. T. DUFFY JR. AND P. JACKSON
BY
ATTORNEY

Jan. 19, 1943. J. T. DUFFY, JR., ET AL 2,308,591
CONVEYER
Original Filed Sept. 16, 1939 8 Sheets-Sheet 8

INVENTORS
J. T. DUFFY JR. AND P. JACKSON
BY
ATTORNEY

Patented Jan. 19, 1943

2,308,591

UNITED STATES PATENT OFFICE 2,308,591

CONVEYER

James T. Duffy, Jr., and Paul Jackson, York, Pa., assignors to Read Machinery Co., Inc., York, Pa., a corporation of Pennsylvania Original application September 16, 1939, Serial No. 295,203. Divided and this application February 13, 1941, Serial No. 378,736

2 Claims. (Cl. 198—204)

This invention relates to a new and improved bread making apparatus and is a division of the invention shown in our application filed in the United States Patent Office September 16, 1939, Serial No. 295,203, issued as Patent No. 2,255,282.

An object of the invention is to provide an improved apparatus for manufacturing bread in which the dough is handled by automatic machinery from the mixer, through several stages to the oven, baked, and the bread is then adapted to be delivered to slicing and wrapping devices.

Another object of the invention is to provide an improved apparatus for making bread in which the bread is manufactured in the form of a continuous strip.

Another object of the invention is to provide an improved apparatus for making bread in the form of a continuous strip in which there are means for conveying the dough through the apparatus and guide means arranged in parallel spaced relation longitudinally above the conveyer for confining the dough to a predetermined width.

Another object of the invention is to provide an improved apparatus for the manufacture of bread in a continuous strip of the above type, in which there are means for laterally shifting the position of the guide means with relation to the conveyer.

Other objects, features, and advantages of the present invention will be apparent from the detailed description to follow, taken with the accompanying drawings, in which.

By the improved invention bread is adapted to be manufactured in a continuous strip in the manner to be hereinafter described in detail, and in describing the invention we have shown an apparatus which has, in actual practice, been found suitable for the purpose.

Figure 1:
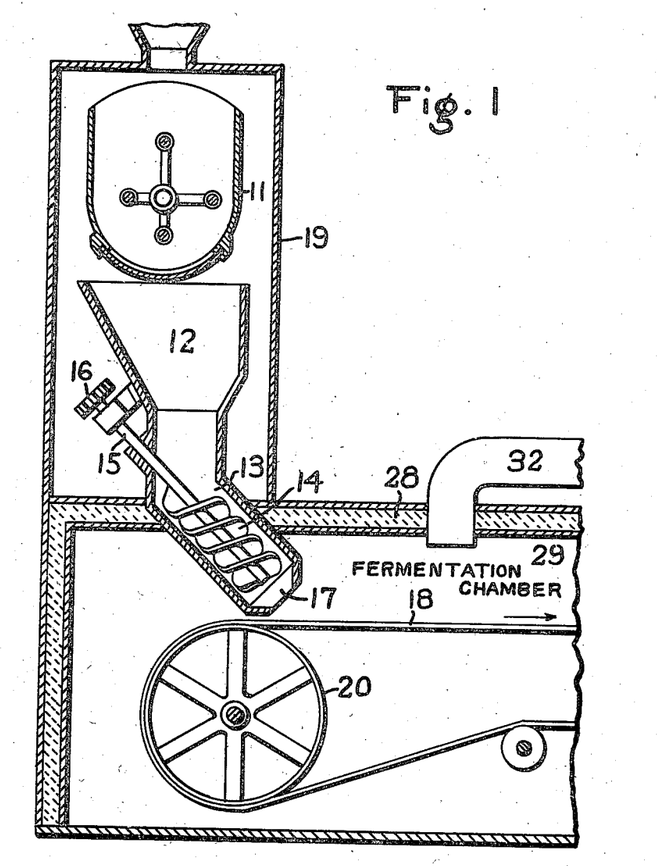
Figs. 1 to 5 inclusive are diagrammatic views, partly in section and partly in elevation, of a continuous bread manufacturing plant embodying the present invention.

In carrying out the invention the raw ingredients are delivered to the usual mixing equipment, indicated at 11, Fig. 1.

From the mixer 11, the dough is discharged into the hopper 12 of an extruding machine 13.

The extruding machine 13 has a spiral conveyor 14 mounted upon a shaft 15, which extends through one end of the housing of said machine.

The shaft 15 may be operated by any suitable mechanism. In the present instance the shaft 15 has fixed thereto a gear 16 which may be operatively connected in any desired manner to a suitable source of power adapted to impart rotation to the shaft 15 at the desired rate of speed.

The discharge end of the extruding machine is formed with a converging mouth 17.

The purpose of the extruding machine 13 is to form the dough in a continuous strip of uniform cross section, the strip of dough thus formed being discharged on to the belt 18 of a conveyer, for fermentation.

If so desired, the upper portion of the extruding machine 13, as well as the mixer 11, may be enclosed in a housing 19.

Figure 2:
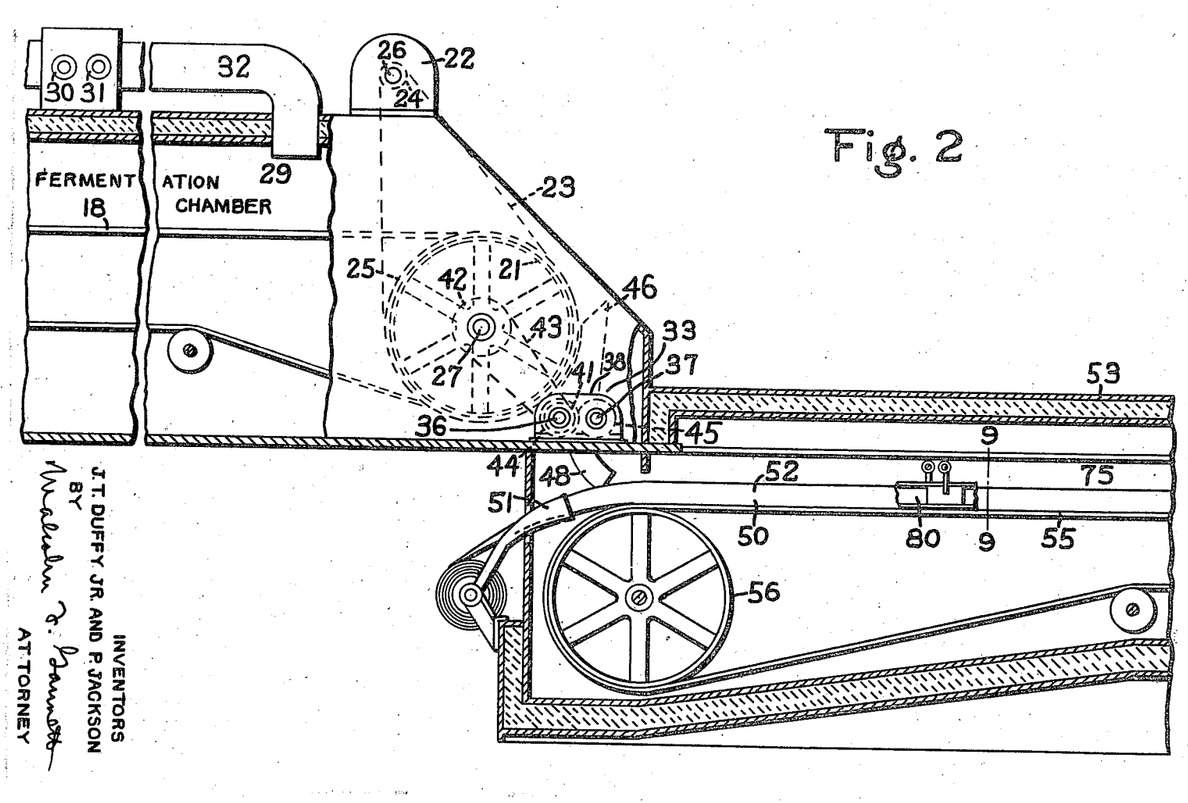

The conveyer 18 may be in the nature of an endless belt conveyer supported at each end by suitable pulleys or wheels 20 and 21, the wheel 21 being operatively connected to an electric motor 22, or other suitable source of power, by means of a belt or chain 23 mounted, respectively, on pulleys or sprockets 24 and 25 fixed to the motor shaft 26 and the pulley or wheel shaft 27, as shown in Fig. 2. The motor 22 is adapted to operate the belt 18 in the direction of the arrow, Fig. 1, at the desired speed.

The conveyer 18 is enclosed by a suitable housing 28, said housing providing a fermentation chamber 29 for the apparatus.

In order that the atmosphere within the chamber 29 can be controlled, suitable humidity and temperature controls 30 and 31, respectively, are provided. These controls may be operatively connected with the chamber 29 by means of ducts or pipes 32, as shown in Figs. 1 and 2.

Since the strip of unfermented dough is discharged from the extruding machine 13 on to the conveyer 18 near one end of the chamber 29, said conveyer 18 and said fermentation chamber 29 should have sufficient length to enable the desired amount of fermentation to take place in the dough during the movement of the dough from one end of the chamber 29 to the opposite end of said chamber.

Figures 6, 7:
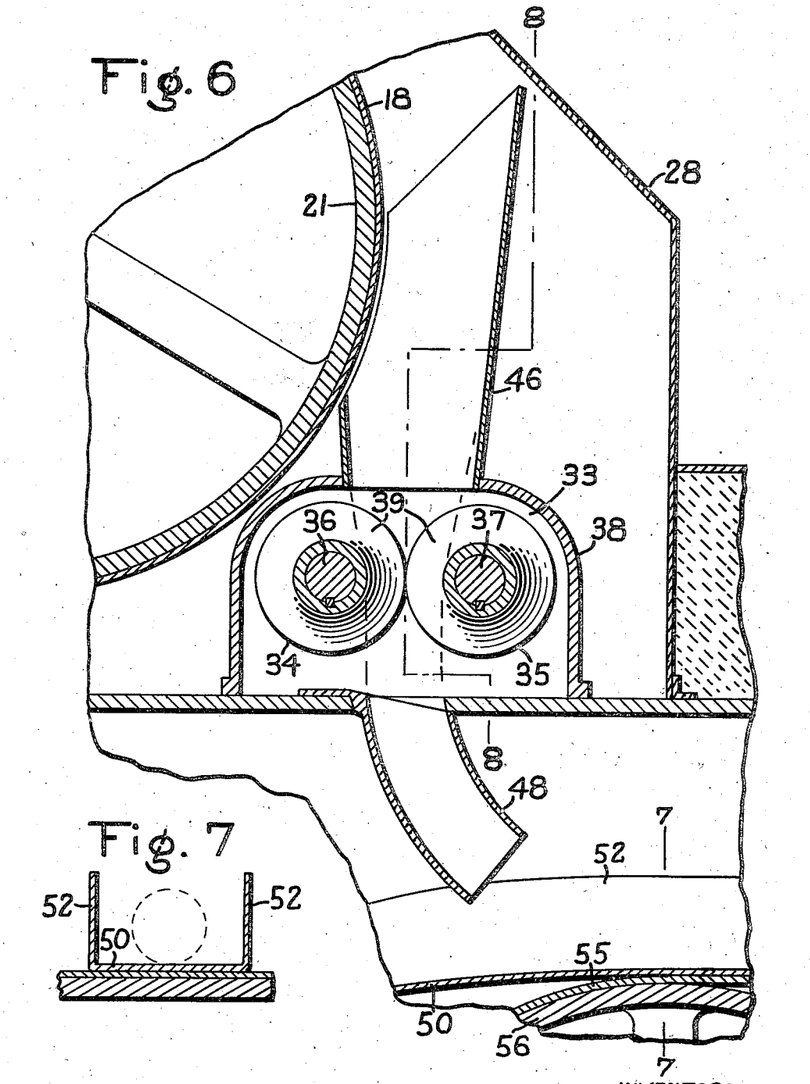
Fig. 6 is an enlarged vertical longitudinal section of the dough forming mechanism shown in Fig. 2.
Fig. 7 is a vertical transverse section taken on the line 7—7 of Fig. 6.
Figure 8:
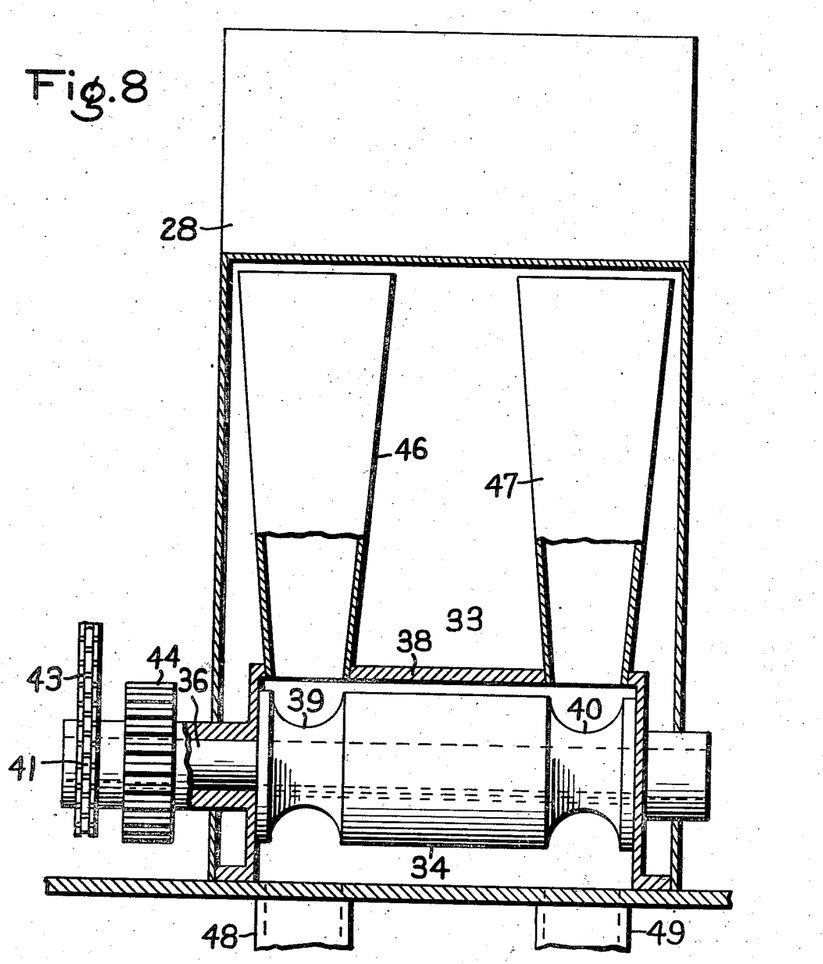
Fig. 8 is a vertical section taken on the line 8—8 of Fig. 6.

At the discharge end of the fermentation chamber 29 there are means, such as forming mechanism 33 for sizing and shaping the dough (see Figs. 2, 6 and 8).

The forming mechanism 33 comprises a pair of rollers 34 and 35 mounted on a pair of parallel shafts 36 and 37 journalled in a housing 38 arranged on the structure of the apparatus adjacent to the conveyer wheel 21.

While any number of strips of dough may be made with the apparatus, in the present instance the device is shown as being constructed so that two strips can be manufactured at one time. Therefore, two strips of dough are adapted to be carried on the conveyer 18 from two extruding machines 13 to the forming mechanism 33.

Each roller 34, 35 is formed with a pair of spaced arcuate grooves 39 and 40, the grooves 39 of both rollers alining with each other so as to provide an orifice through which one strip of dough passes, and the grooves 40 alining with each other so as to provide a similar orifice for the second strip of dough.

The rollers are adapted to be rotated at the desired number of revolutions per minute. In the present instance the shaft 36 is shown as provided with a sprocket 41 which is operatively connected to a sprocket 42 on the shaft 27 by a chain 43 so that when the conveyer 18 is operated, the roller 34 will also be operated.

In order to transmit the rotary motion of the roller 34 to the roller 35, but in the reverse direction, the shaft 36 of roller 34 has mounted thereon a gear 44, which gear is in meshing relationship with a similar gear 45 on the shaft 37 of roller 35.

The strips of dough on the conveyer 18 are directed towards the grooves 39 and 40, respectively, of the rollers, by funnel-shaped or conical chutes 46 and 47, respectively. These chutes terminate in the upper portion of the housing 38 directly over the grooves of the rollers, as shown in Fig. 6.

The purpose of the forming mechanism 33 is to work the strips of dough and to mould the dough into the desired shape and cross section.

After the strips of dough pass through the forming mechanism 33, they are directed by tubular guides 48 and 49 on to supporting means 50, which supports the dough strips while they travel through the final steam proofer 53 and oven 54.

Any suitable material may be employed for the dough supporting means 50. In actual practice, wax paper has proven good for this purpose, since the dough will not adhere thereto. The wax paper can be delivered from rolls having scores lengthwise of the paper. The paper after leaving the rolls, passes through suitable means, indicated at 51, Fig. 2, which means are adapted to bend or fold the wax paper lengthwise, so as to form the supporting means 50 with vertical side walls 52, as shown in Figs. 6 and 7. In this way the supporting means is U-shaped or of channel form in cross section so that the dough will be supported on the bottom and both sides. On the other hand, if it is desired to produce what is known as "Pullman" slices of bread by the improved process, then in lieu of the U-shaped paper strip supporting means 50, a tubular paper member may be employed, such tubular member being rectangular in cross section. Or any other suitable element may be used for supporting the strip of dough during the proofing and baking steps, in order to impart to the baked products the desired shape and size.

Figure 3:
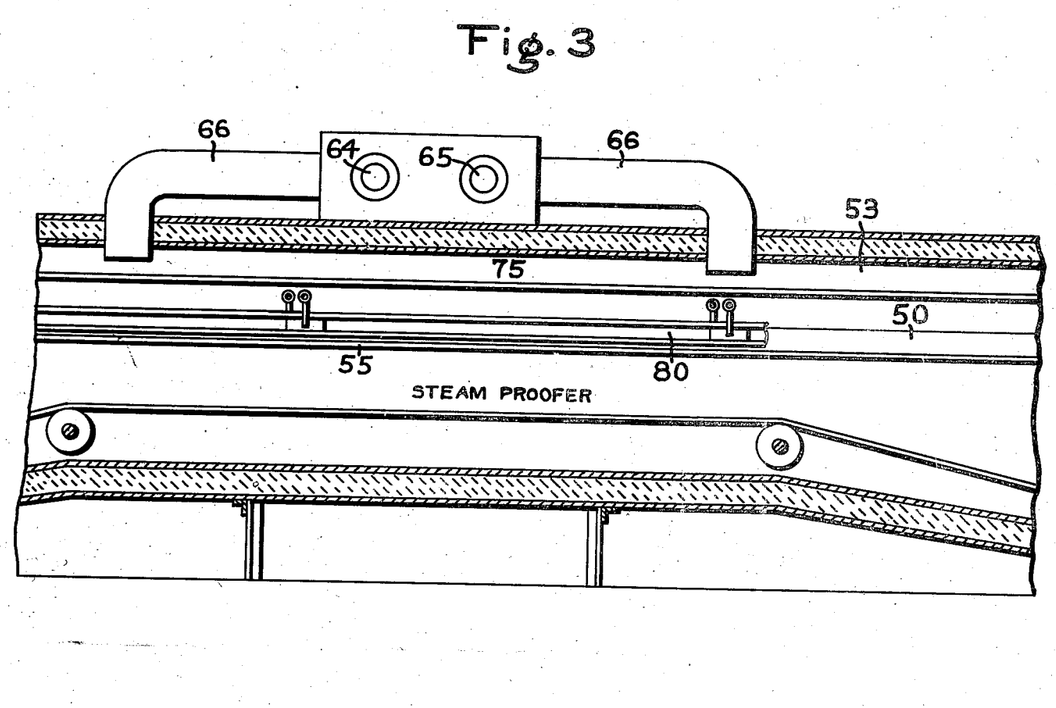
Figure 4:
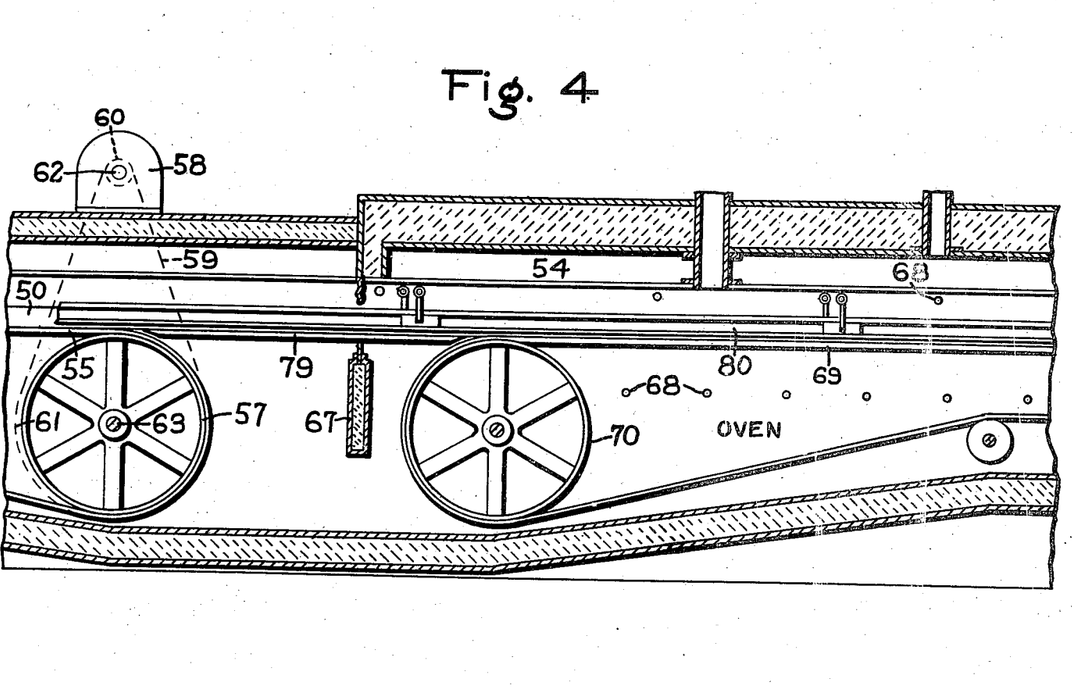

As shown in Figs. 2, 3 and 4, the steam proofer 53 comprises an elongated structure having insulated walls, top and bottom to provide a chamber 75 in which is mounted a conveyer 55 which carries the strips of dough on the supporting means 50 through the steam proofer.

The conveyer 55 may be in the form of an endless belt conveyer supported at each end by suitable pulleys or wheels 56 and 57, the wheel 57 being operatively connected to an electric motor 58, or other source of power, by means of a belt or chain 59 mounted, respectively, on pulleys or sprockets 60 and 61 fixed to the motor shaft 62 and the shaft 63 of the wheel 57, respectively, as shown in Fig. 4.

The conveyer 55 is entirely enclosed by the walls of the steam proofer 53, the end of the conveyer having the wheel 56 being located beneath the guides 48 and 49 and the end of the conveyer having the wheel 57 being located adjacent to the end of the steam proofer 53 which is connected to one end of the oven 54 (see Fig. 4).

In order that the atmosphere within the steam proofer 53 can be controlled, suitable humidity and temperature controls 64 and 65, respectively, are provided (see Fig. 3). These controls may be operatively connected with the chamber 75 by means of ducts or pipes 66.

The steam proofer 53 and the oven 54 are connected end to end, but since the temperature within the oven 54 is considerably higher than the temperature within the steam proofer, a dividing wall 67 is constructed, as shown in Fig. 4.

The oven 54 comprises an elongated structure having comparatively thick insulated walls, of well known construction.

Extending into the oven 54 are burners 68 or other means for controlling the amount of temperature within the oven.

Figure 5:
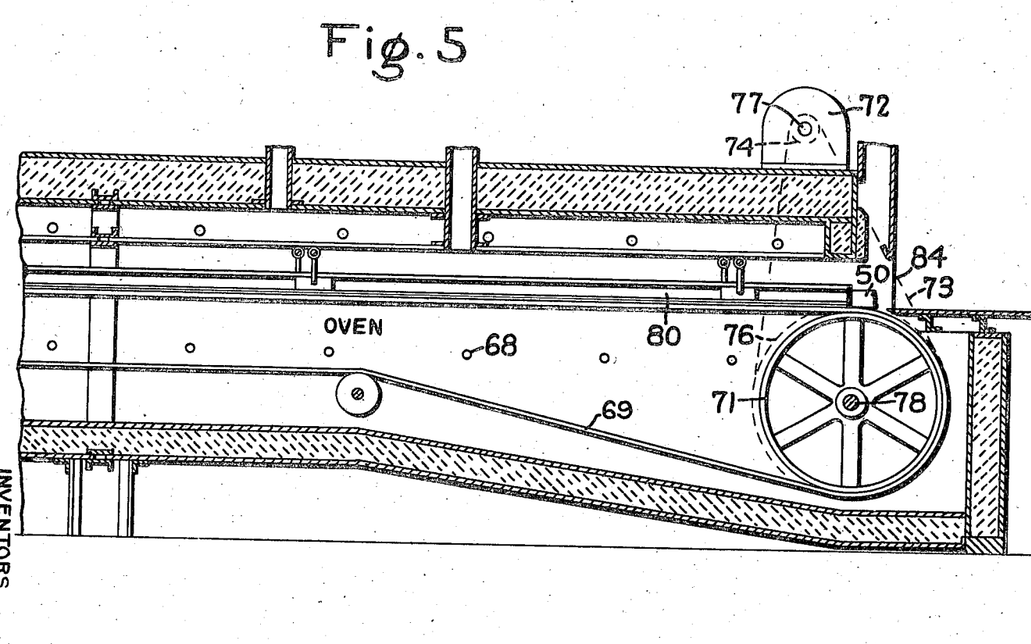

Disposed within the oven 54 is a conveyer in the form of an endless belt 69 supported at each end by suitable pulleys or wheels 70 and 71, the wheel 71 being operatively connected to an electric motor 72, or other source of power, by means of a belt or chain 73 mounted, respectively, on pulleys or sprockets 74 and 76, fixed to the motor shaft 77 and the shaft 78 of the wheel 71, respectively, as shown in Fig. 5.

The conveyer 69 is enclosed by the walls of the oven 54, the space between the end of the conveyer having the wheel 70 and the adjacent end of the steam proofer conveyer 55 being provided with a horizontally disposed plate 79 which is disposed in the same plane as the upper horizontal portions of said conveyers so as to support the members 50 and the strips of dough therein when such strips move from the steam proofer 53 into the oven 54.

For the purpose of supporting the side walls 52 of the dough supporting means 50, stationary side guides 80, 81, 82 and 83 are provided. These guides extend the full length of both the steam proofer 53 and the oven 54, from a point adjacent to the members 48, 49 to the oven outlet or discharge opening 84.

Figure 9:
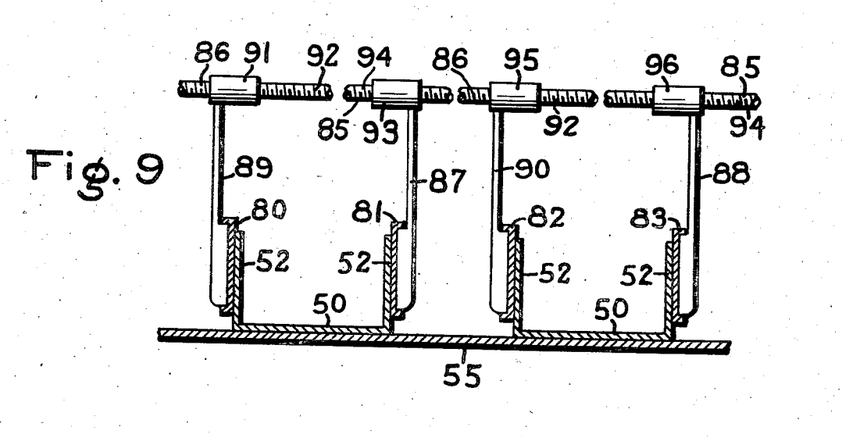
Fig. 9 is a vertical transverse section taken on the line 9—9 of Fig. 2.
Figure 10:
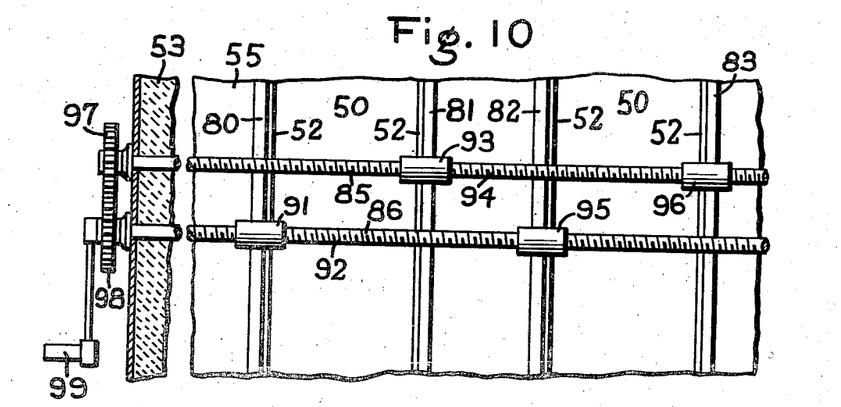
Fig. 10 is a plan of the structure shown in Fig. 9, showing also the operating mechanism for the adjustable side guides.

The guides are disposed in pairs, one pair for each strip of dough, the guides 80 and 81 constituting one pair, and the guides 82 and 83 constituting the other pair, as shown in Figs. 9 and 10.

In order to provide means for adjusting the distance between each pair of guides so that the apparatus can be used for making bread of various widths, suitable adjusting mechanism is provided in the means for supporting the guides.

At intervals throughout the length of the steam proofer 53 and the oven 54, pairs of horizontal rods 85 and 86 are mounted in the side walls of the structure in spaced relation above the conveyers 55 and 69.

Depending from the rods 85 are hangers 87 and 88, and depending from the rods 86 are hangers 89 and 90.

The lower end of the hanger 89 is connected to the guide 80.

Likewise, the lower ends of the hangers 87, 90 and 88, are connected to the guides 81, 82 and 83, respectively.

The upper portion of the hanger 89 is formed with an internally threaded collar 91 which is mounted on a screw threaded portion 92 of the rod 86.

The upper portion of the hanger 87 is formed with an internally threaded collar 93 which is mounted on a screw threaded portion 94 of the rod 85.

The hanger 90 is also formed at its upper portion with a collar 95 which is internally threaded for engagement with the screw threads 92 of the rod 86, and the hanger 88 has an internally threaded collar 96 which is mounted on the threaded portion of the rod 85.

Figure 11:
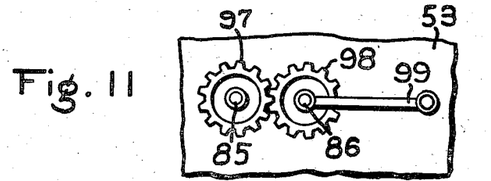
Fig. 11 is a side elevation of the operating mechanism shown in Fig. 10.

In order to rotate the rods 85 and 86 so as to move the hanger 89 towards and away from the hanger 87, and the hanger 90 towards and away from the hanger 88, the extremities of the rods 85 and 86 which are disposed on the exterior of the structure, each have mounted thereon a gear 97 and 98, respectively, as shown in Figs. 10 and 11, said gears having their teeth in meshing relationship.

A crank 99 is fixed to the end of the rod 86.

Operation of the crank 99 will effect rotation of the rods in the opposite directions, and since the collars are held by the guides from turning, the hangers 89 and 90 will be moved in one direction and the hangers 87 and 88 will be moved in the opposite direction, thereby moving the guides 80 and 81 and 82 and 83 towards or away from each other, depending upon the direction of rotation imparted to the crank 99.

From the oven 54 the baked strips of bread are adapted to be delivered on to a conveyer, not shown, for cooling, slicing and wrapping.

From the foregoing it will be understood that we have provided an improved apparatus for making bread in a continuous strip, in which the dough is conveyed through chambers equipped with temperature and humidity controlling means from the time the dough is mixed until the baked product leaves the oven, and in which no human hands are required to handle the product at any stages of the operation. The oven 54 is adapted to bake the bread in the usual time, and in order that the operation will be uniform, the conveyers 18, 55 and 69 should be operated at the same rate of speed by their respective operating mechanisms. Since the dough is conveyed through the several chambers 29, 75 and 54 at the same speed, such chambers should be constructed of sufficient length to permit, first, the dough to ferment properly in the fermentation chamber 29, and, second, to be proofed in the desired manner in the steam proofer chamber 75.

Having thus described our invention, what we claim is:

1. In combination with a conveyer adapted to convey material thereon in a direction lengthwise thereof from end to end of the conveyer, a pair of substantially parallel guide members arranged lengthwise of the conveyer and located in spaced relation above said conveyer for confining the material on the conveyer to a predetermined width, a pair of screw threaded horizontal rods arranged transversely of the conveyer in spaced relation above said guide members, a hanger depending from each said transverse rod and connected to a guide member for supporting the same, each hanger having an internally screw threaded collar mounted on the threaded portion of each rod, a gear mounted on an end of each threaded rod, said gears having teeth in meshing relationship so that rotation of one gear in one direction effects rotation of the other gear in the opposite direction, and a crank arm fixed to one of said threaded rods for operating said gears whereby rotation of the pair of threaded rods by said gears in opposite directions imparts lateral movement to the hangers and the guide members carried thereby simultaneously in opposite directions so that the guide members are moved either towards each other or away from each other depending upon the direction in which the crank arm is turned.

2. In combination with a conveyer adapted to convey a plurality of strips of material thereon in a direction lengthwise of the conveyer, two pairs of substantially parallel guides arranged lengthwise of the conveyer in parallel spaced relation to each other, said guides each comprising a pair of bars adapted to confine a strip of material on the conveyer to a predetermined width, a pair of screw threaded horizontal rods arranged transversely of the conveyer in spaced relation above said guides, a hanger depending from each said transverse rod and connected to a guide, said hangers being adapted to support the guides in spaced relation above said conveyer, each hanger having an internally screw threaded collar mounted on the screw threaded portion of each rod, each rod having the collars of two hangers mounted thereon in spaced relation, said two hangers operatively connected to one threaded rod supporting the guides at one side of each of said pair of guides, said two hangers operatively connected to the other threaded rod supporting, respectively, the bars at the other side of each of said pair of guides, a gear mounted on an end of each threaded rod, said gears having teeth in meshing relationship so that rotation of one gear in one direction effects rotation of the other gear in the opposite direction, and a crank arm fixed to one of said threaded rods for operating said gears whereby rotation of the pair of threaded rods by said gears in opposite directions imparts lateral movement to the hangers and to the guides carried thereby simultaneously in opposite directions so that each pair of guides are moved either towards each other or away from each other depending upon the direction in which the crank arm is turned, to thereby increase or decrease the distances between each pair of guides, respectively.

JAMES T. DUFFY, JR.
PAUL JACKSON.